G. E. BOLTON.
TOOL FOR FORMING BOTTLE NECKS.
APPLICATION FILED SEPT. 5, 1908.

947,632.

Patented Jan. 25, 1910.
6 SHEETS—SHEET 2.

Witnesses:

Inventor,
George E. Bolton
By *Attorney*

G. E. BOLTON.
TOOL FOR FORMING BOTTLE NECKS.
APPLICATION FILED SEPT. 5, 1908.

947,632.

Patented Jan. 25, 1910.
6 SHEETS—SHEET 3.

Witnesses
Inventor
George E. Bolton
By
Attorney

G. E. BOLTON.
TOOL FOR FORMING BOTTLE NECKS.
APPLICATION FILED SEPT. 5, 1908.

947,632.

Patented Jan. 25, 1910.
6 SHEETS—SHEET 4.

Witnesses:
T. L. McCabe
Frank G. Brewton

Inventor:
George E. Bolton
By
Attorney

G. E. BOLTON.
TOOL FOR FORMING BOTTLE NECKS.
APPLICATION FILED SEPT. 5, 1908.

947,632.

Patented Jan. 25, 1910.
6 SHEETS—SHEET 5.

G. E. BOLTON.
TOOL FOR FORMING BOTTLE NECKS.
APPLICATION FILED SEPT. 5, 1908.

947,632.

Patented Jan. 25, 1910.
6 SHEETS—SHEET 6.

Witnesses
Inventor
George E. Bolton
By
Attorney

UNITED STATES PATENT OFFICE.

GEORGE E. BOLTON, OF CHICAGO, ILLINOIS, ASSIGNOR TO CAMPBELL CARRINGTON, OF BALTIMORE, MARYLAND.

TOOL FOR FORMING BOTTLE-NECKS.

947,632.

Specification of Letters Patent.　Patented Jan. 25, 1910.

Application filed September 5, 1908. Serial No. 451,851.

*To all whom it may concern:*

Be it known that I, GEORGE E. BOLTON, a citizen of the United States, residing at Chicago, in the county of Cook and State of Illinois, have invented certain new and useful Improvements in Tools for Forming Bottle-Necks, of which the following is a specification.

This invention relates to tools for forming the necks of bottles or jars, more particularly to forming the sealing seat and the overhanging locking shoulder in the interior of the neck; and it consists of the novel construction and peculiar arrangement of the several parts of the tool, as will be hereinafter more fully described in this specification and briefly stated in the claims.

So far as I am aware, the invention involves an entirely new principle in the art of making an inside finish in the neck of a bottle or jar by which a perfectly uniform sealing seat and the overhanging locking shoulder or surface, and, in fact, the entire groove, may be effected.

Heretofore, great difficulty has been experienced in making finishes of this character with any certain degree of uniformity; that is to say, the groove would be deeper at one point than at another, and the locking shoulder would vary in depth, so that a seal designed for the particular formation of groove and shoulder and to be locked therein, could not be tightly locked to its seat, resulting in an imperfect seal, and therefore one of the principal objects of the present invention is to provide a tool whose neck-forming mechanism shall be of such novel and peculiar construction, that its parts can be simultaneously and uniformly expanded to form a groove of the desired shape, and contracted in order to be withdrawn from the mouth of the bottle or jar, after the formation of the neck, without injuring or distorting the newly formed groove.

Other objects of the invention will become apparent upon a complete disclosure thereof.

The tool may be fitted to and operated by machines of the ordinary type for making bottles and jars, and its movement, in so far as the preliminary mold and the bottle are concerned, is vertical, not being dependent upon a rotary movement of either the tool or the bottle, one of the purposes of the invention being to overcome the disadvantages arising from the use of tools that involve a rotary movement.

In illustrating my invention, I have shown a blanking mold in which the preliminary molding is effected, and also a mold in which the blowing operation is accomplished in the final completion of the bottle or jar.

Referring to the several views, the letter A designates the preliminary or blanking mold, and B the finishing mold.

Figure 4:
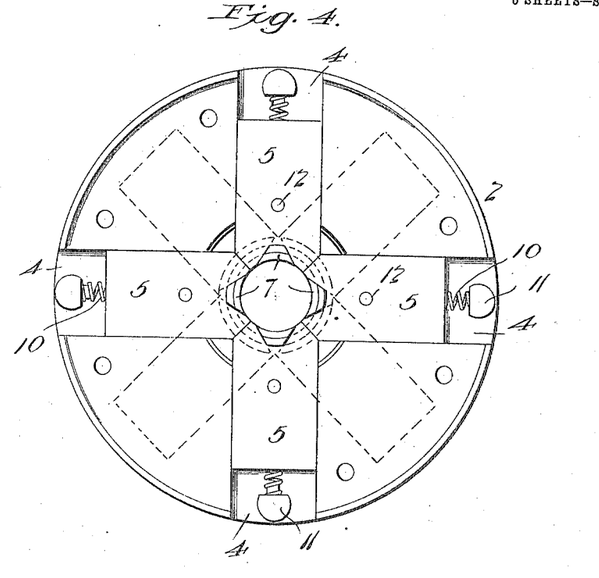
Fig. 4 is a bottom plan view of the upper part of the plunger ring or block, showing one section of the slidable neck forming segments, the latter occupying their innermost or contracted position.
Figure 5:
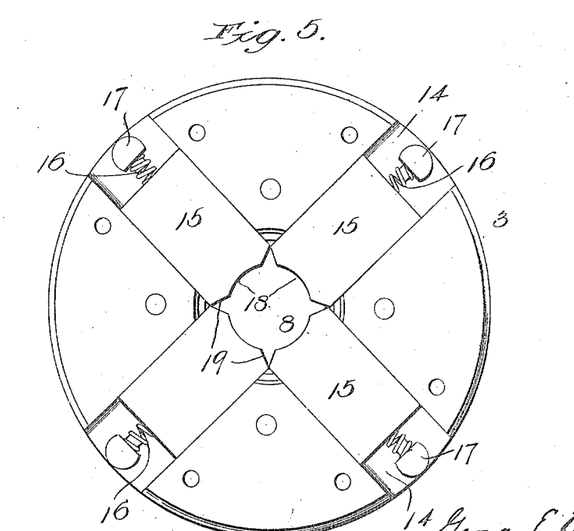
Fig. 5 is a top plan view of the lower part of the plunger ring or block, showing the other set of the slidable neck forming segments, the latter also being in their innermost or contracted position.
Figure 11:
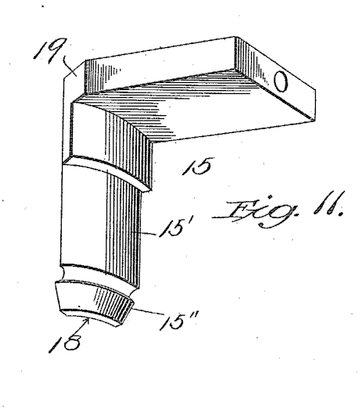
Fig. 11 is a similar view of one of the lower slidable neck forming segments.
Figure 12:
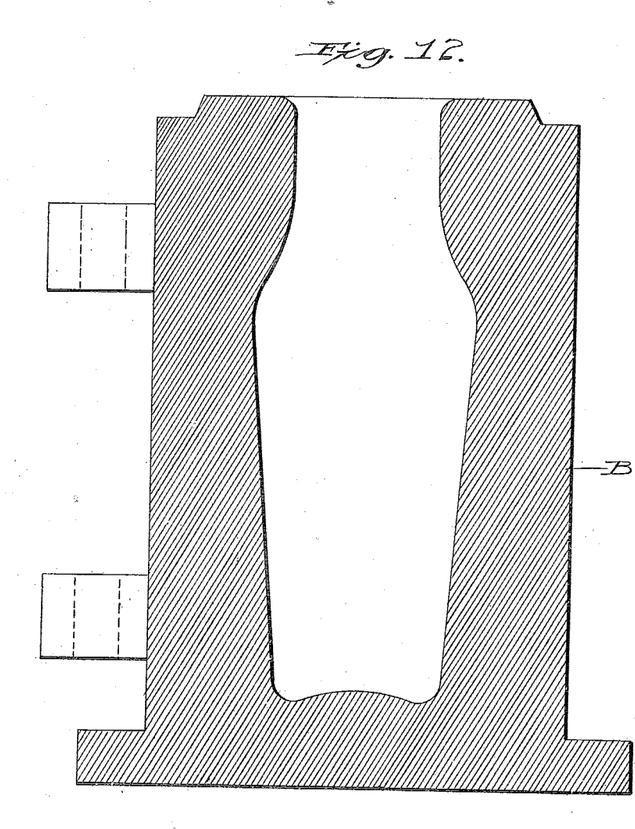
Fig. 12 is a vertical section of the final finishing mold, in which the partially completed bottle or jar is blown in to the finished article.

The numeral 1 indicates what I will term a plunger block or ring, which is formed of two parts or sections, an upper part 2 and a lower part 3. The upper part is provided with four radially arranged grooves or recesses 4, in each of which an arm 5 of a slidable neck forming member 6 is adapted to operate. The lower end 7 of each member is exteriorly formed with a contour conforming in cross section, to the form or shape of the groove that the neck of the bottle or jar is to have. In the present instance, the ends of these members are formed with a shoulder $a$, designed to form the over hanging locking surface; a beveled portion $b$, which is designed to form the wall of the groove, and a flat horizontal portion $c$ designed to form the sealing seat. The vertical arm of these members extends through a central opening 8 of the lower part or section of the plunger block which is of sufficient diameter to permit the members to move laterally the necessary distance to form the groove within the bottle or jar. The horizontal arm 5 of each member is provided with a socket 9 in which is arranged a spiral spring 10, the outer end of which abuts against a stud 11. The tendency of these springs is to keep the members normally forced toward the center of the plunger block or, in other words to normally hold the members in their inner or contracted position, the inward movement being limited by pins 12 which project from the upper part or section 2 into recesses 13 in the arms 5 of the members.
Referring now to the lower part or section 3 of the plunger block, attention being particularly directed to Fig. 5, the numeral 14 indicates four radial grooves or recesses which, when the two sections are assembled, one upon the other, lie between the grooves or recesses 4 of the upper section 2, as shown in Fig. 4. Mounted in the recesses 14 is a second set of slidable neck forming members 15, the vertical arm 15' of which is provided with an end 15" to correspond with the end 7 of the vertical arm of the slidable members 6. Each member is spring pressed by a spring 16 seated in a socket in the end of each horizontal arm of the members, the free ends of the springs abutting against studs 17. The arrangement of these springs is similar in all respects to the springs 10 of the upper set of members and tends to exert a constant pressure against their respective members to normally hold them in their extreme inner limited movement, or contracted position. The inner face of each member 15' is curved or concaved in cross section, as indicated at 18, Figs. 5 and 11, the purpose of which will be presently explained, and the inner corners slightly beveled, as indicated at 19. The inner corners of the upper set of members are beveled at an angle to correspond with the angle of the bevels 19 so that when both sets of members are assembled their respective beveled side edges will fit accurately together, with the upper set of members arranged alternately between the lower set of members, thus completing a bottle neck formed of novel design, which forms an important feature of my invention, and by means of which a smooth uniformly annular groove of any desired shape in cross section, may be formed in the bottle neck by simultaneously expanding the members, as will be hereinafter explained.

Figure 6:
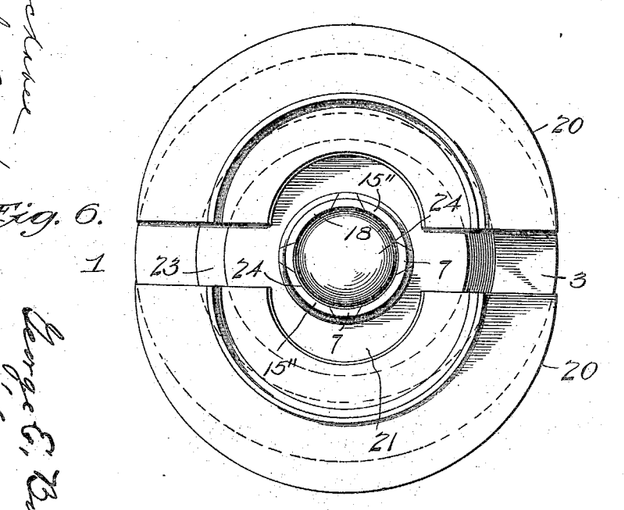
Fig. 6 is a bottom plan view of the tool, the plunger being inserted therein and the neck forming parts in expanded position.
Figure 7:
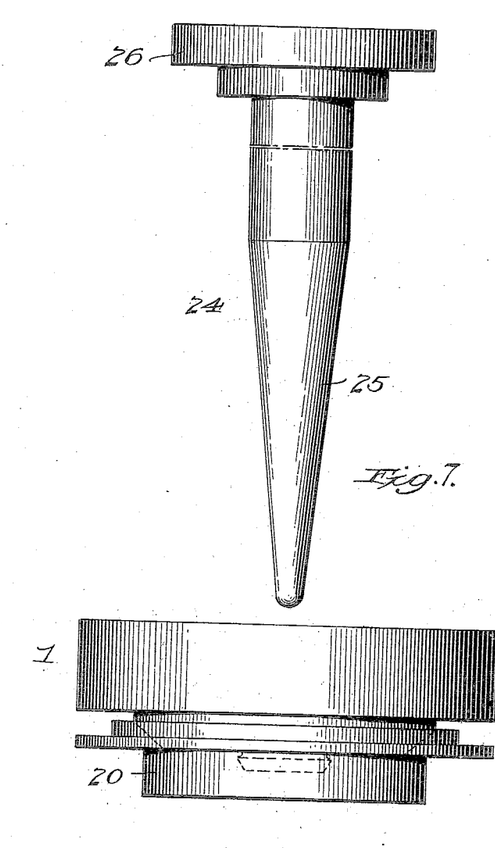
Fig. 7 is a side elevation of the tool, and the plunger above the same.
Figure 8:
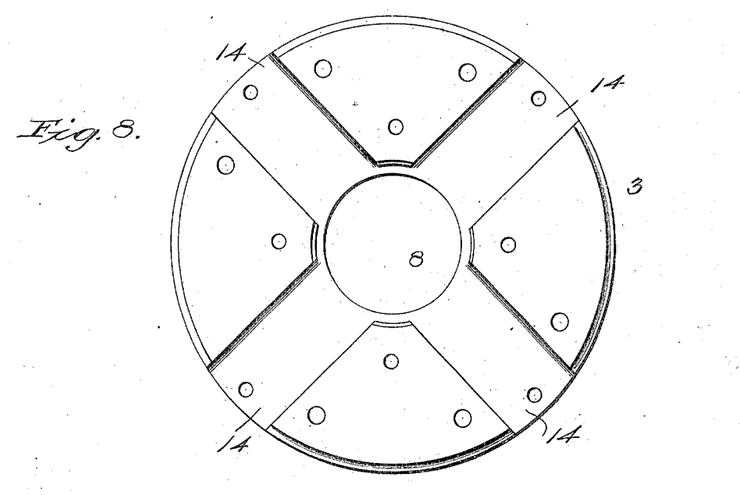
Fig. 8 is a top plan view of the lower part of the plunger block, more clearly showing the grooves or recesses in which operate the lower, slidable segments of the neck forming members.
Figure 9:
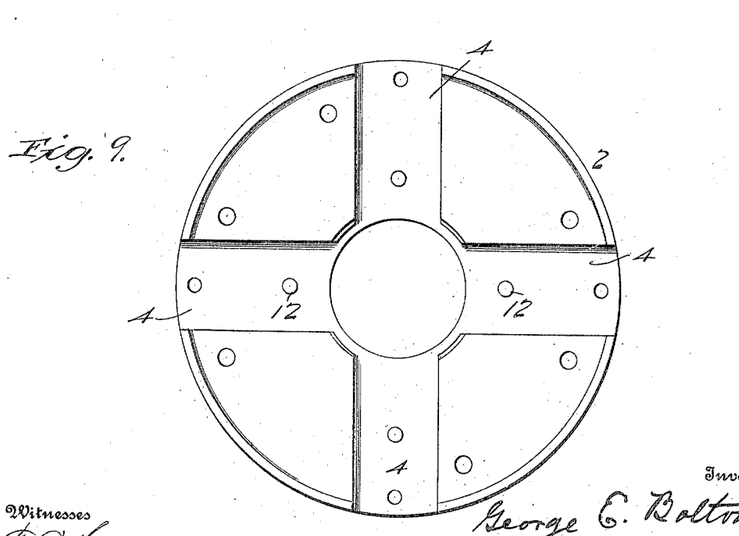
Fig. 9 is a bottom plan view of the upper part of the plunger block, showing the grooves or recesses in which operate the upper, slidable segments of the neck forming members.
Figure 10:
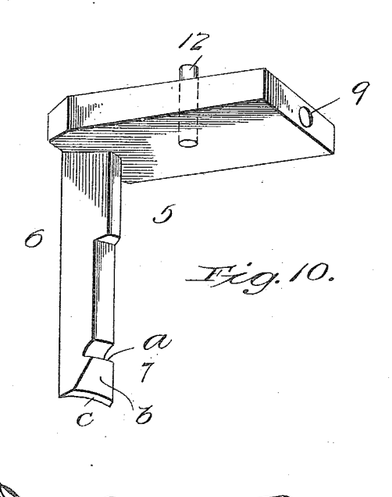
Fig. 10 is a perspective view of one of the upper slidable neck forming segments.

The numeral 20 indicates a backing plate or ring divided into two parts or halves, best shown in Fig. 6. The inner edge of each part or half is provided with a semi-circular recess 21, the edge of which in cross section may be of any shape or contour desired for the outer surface of the bottle or jar neck. The upper surface of the two halves, forming the plate or ring, is provided with a depression 22, in which is seated and supported the neck forming tool.

The numeral 24 indicates the plunger, which is made tapering for a portion of its length to facilitate its entrance through the opening formed by the inner curved or concaved faces of the assembled slidable segments. The plunger is provided with a head 26 by which it may be attached to any suitable reciprocating part of a glass blowing machine.

In operation, the required charge of molten glass is poured into the mold A. The tool supporting plate being in place upon the top of the mold, the tool is then seated in the depression in the upper face of the supporting plate. As the plunger enters the mold the molten glass is forced upward between it and the inner wall of the mold and up into the circular opening formed in the two halves of the supporting plate, the wall of said opening providing a backing for the bottle neck which is being formed. As the plunger makes its downward movement it forces the two sets of slidable members forming the neck forming medium, simultaneously and uniformly outward, forming the groove of the desired shape within the bottle neck. The plunger is then withdrawn, allowing the slidable members to be returned to their normal position by the action of the two sets of springs 10 and 16, and withdrawn from the mouth of the bottle or jar without danger of distorting or injuring the form of the locking shoulder, leaving a perfect and uniformly formed groove. After the neck forming tool has been withdrawn or moved from its seat on the supporting plate, the latter, with the suspended blank or partly formed bottle, is removed to the finishing mold B, into which the partly completed bottle is inserted to receive the air blast which blows the body of the bottle into its final and completed shape.

I do not wish to be understood as limiting my invention to the exact construction of the tool herein described and illustrated in the drawings, as various modifications or changes may be made in the construction of the several parts, without departing from the spirit or scope of my invention, or sacrificing the principle thereof.

Figure 1:
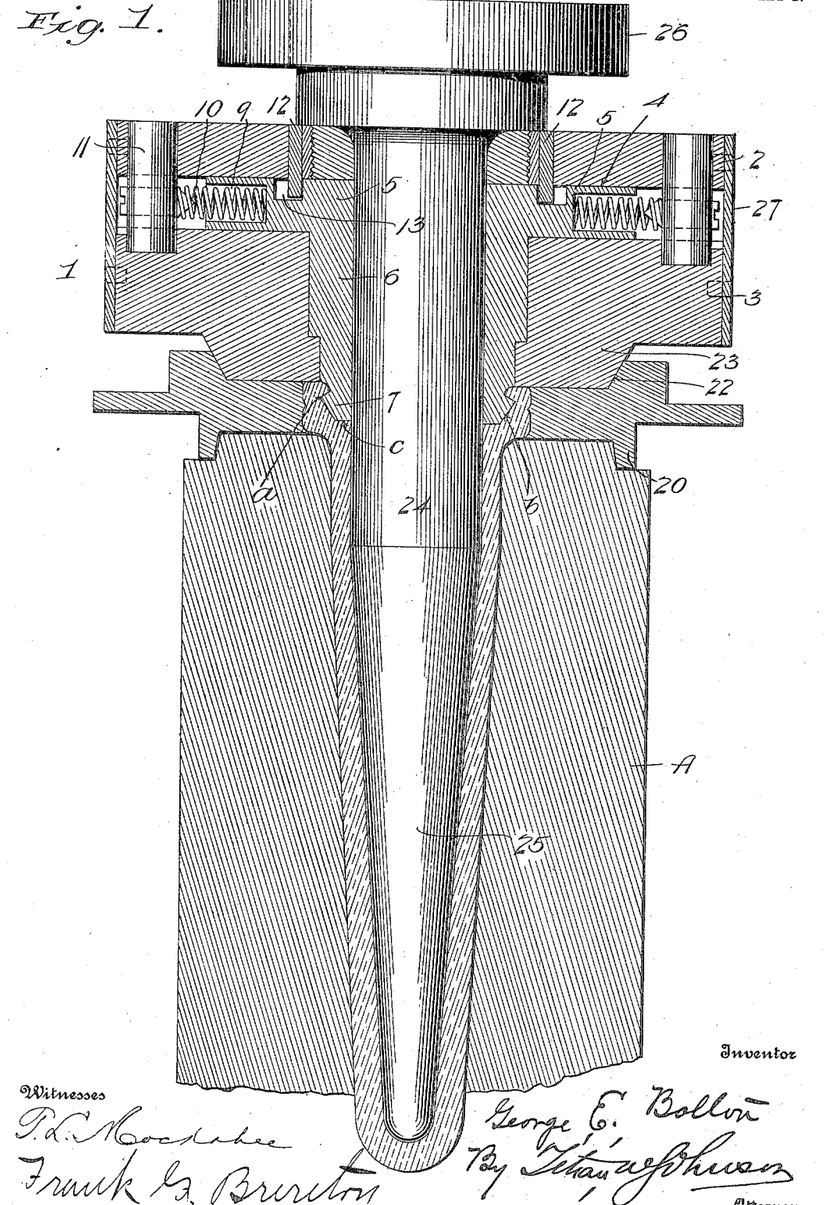
Figure 1 is a central section of the tool, showing the parts in position in which they are expanded to make the groove in the bottle or jar, the tool being mounted upon the preliminary mold.
Figure 2:
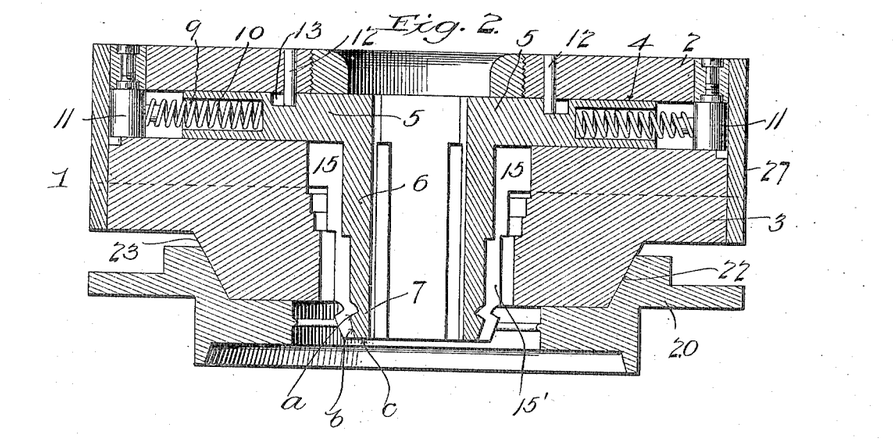
Fig. 2 is a similar view, showing the neck forming parts of the tool in their extreme inward or contracted position, or in the position in which the tool may be withdrawn from the bottle.
Figure 3:
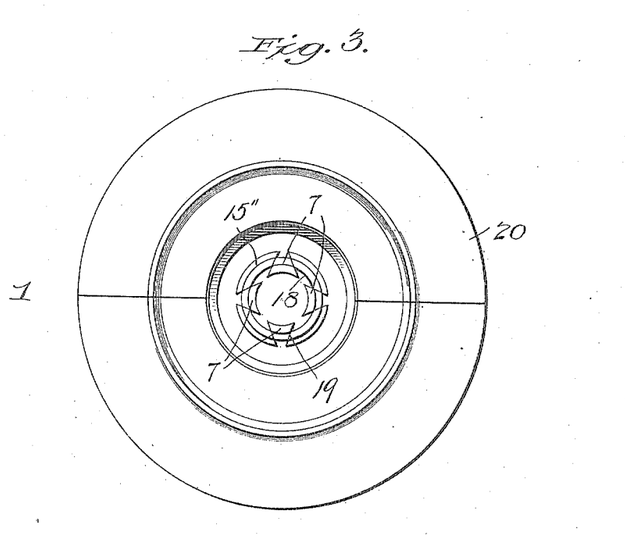
Fig. 3 is a bottom plan view of the tool.

It will be noted that the sectional plunger block is held together by means of a ring or collar 27 as shown in Figs. 1 and 2.

Claims.

1. A tool for forming seats in the necks of bottles or jars, comprising two sets of radially-expansible non-rotatable members, each set composed of a plurality of said members so constructed and arranged that when expanded an uninterrupted forming-edge will be presented, whereby a true, annular seat may be formed in said neck.

2. A tool for forming seats in the necks of bottles or jars, comprising two sets of radially-expansible and contractible non-rotatable members, each set composed of a plurality of said members so constructed and arranged that when expanded an uninterrupted forming-edge will be presented, whereby a true, annular seat may be formed in said neck, and when contracted may be withdrawn without injury to the seat thus formed.

3. A tool for forming seats in the necks of bottles or jars, comprising two sets of radially-expansible non-rotatable members, each set composed of a plurality of said members adapted to be simultaneously expanded so as to present an uninterrupted forming-edge, whereby a continuous, annular seat may be formed at a single operation.

4. A tool for forming seats in the necks of bottles or jars, comprising two sets of radially-expansible and contractible non-rotatable members, each set composed of a plurality of said members adapted to be simultaneously expanded so as to present an uninterrupted forming-edge, and simultaneously contracted to permit withdrawal.

5. A tool for forming seats in the necks of bottles or jars, comprising upper and lower sets of radially expansible members, adapted to be expanded so as to present an uninterrupted forming-edge, whereby a continuous, annular seat may be formed at a single operation.

6. A tool for forming seats in the necks of bottles or jars, comprising upper and lower sets of radially expansible and contractible members, adapted to be expanded so as to present an uninterrupted forming-edge, whereby a continuous, annular seat may be formed at a single operation, and contracted to permit withdrawal.

7. A tool for forming seats in the necks of bottles and jars, comprising upper and lower sets of radially-expansible members, adapted when expanded, to present an uninterrupted forming-edge, and means for expanding the same, whereby a continuous, annular seat may be formed.

8. A tool for forming seats in the necks of bottles or jars, comprising upper and lower sets of radially-expansible and contractible members, adapted, when expanded to present an uninterrupted forming-edge, and means for expanding and contracting the same.

9. A tool for forming seats in the necks of bottles and jars, comprising two sets of spring-pressed radially-expansible non-rotatable members, each set composed of a plurality of said members so constructed and arranged that, when expanded an uninterrupted forming-edge will be presented, whereby a continuous annular seat may be formed.

10. A tool for forming seats in the necks of bottles or jars, comprising upper and lower sets of radially expansible non-rotatable members, each set composed of a plurality of said members so constructed and arranged that when expanded an uninterrupted forming-edge will be presented, means for exerting a pressure against said members, and means for expanding the same, whereby a continuous, annular seat may be formed.

11. A tool for forming seats in the necks of bottles or jars, comprising upper and lower sets of radially-expansible and contractible members, so constructed and arranged that when expanded an uninterrupted forming-edge will be presented, means for exerting a pressure against said formers, and means for expanding and contracting the same.

12. A tool for forming seats in the necks of bottles or jars, comprising a plunger-block, upper and lower sets of radially-expansible members, so constructed and arranged that when expanded an uninterrupted forming-edge will be presented, whereby a continuous, annular seat may be formed, and means for expanding the said members.

13. A tool for forming seats in the necks of bottles or jars, comprising a plunger-block, upper and lower sets of expansible members, so constructed and arranged that when expanded an uninterrupted forming-edge will be presented, whereby a continuous annular seat may be formed, and means for expanding said members.

14. A tool for forming seats in the necks of bottles or jars, comprising two sets of spring-pressed radially-expansible and contractible non-rotatable members, each set composed of a plurality of said members, so arranged that when expanded an uninterrupted forming-edge will be presented, and when contracted may be withdrawn without injury to the neck of the bottle or jar.

15. A tool for forming seats in the necks of bottles or jars, comprising upper and lower sets of spring-pressed, radially-expansible members, so arranged that when expanded an uninterrupted forming edge will be presented, whereby a continuous, annular seat may be formed.

16. A tool for forming seats in the necks of bottles or jars, comprising upper and lower sets of spring-pressed, radially-expansible and contractible members, so arranged that when expanded an uninterrupted forming-edge will be presented, and when contracted may be withdrawn without injury to the neck of the bottle or jar.

17. A tool for forming seats in the necks of bottles or jars, comprising two sets of spring-pressed radially-expansible non-rotatable members, each set composed of a plurality of said members so arranged that when expanded, an uninterrupted forming-edge will be presented, and means for expanding the same, whereby a continuous, annular seat may be formed.

18. A tool for forming seats in the necks of bottles or jars, comprising two sets of spring-pressed, radially expansible and contractible non-rotatable members, so arranged that when expanded an uninterrupted forming-edge will be presented, and means for expanding and contracting the same.

19. A tool for forming seats in the necks of bottles or jars, comprising upper and lower sets of spring-pressed, radially-expansible members, so arranged that when expanded an uninterrupted forming-edge will be presented, and means for expanding the same, whereby a continuous, annular seat may be formed.

20. A tool for forming seats in the necks of bottles or jars, comprising upper and lower sets of spring-pressed, radially-expansible and contractible members, so arranged that when expanded to present an uninterrupted forming-edge will be presented, and means for expanding and contracting the same.

21. A tool for forming seats in the necks of bottles or jars, comprising a two-part plunger-block, two sets of radially expansible non-rotatable members, each set composed of a plurality of said members adapted to be simultaneously expanded so as to present an uninterrupted forming-edge, and a reciprocatory plunger.

22. A tool for forming seats in the necks of bottles or jars, comprising a two-part plunger block, two sets of radially-expansible and contractible non-rotatable members, adapted to be simultaneously expanded so as to present an uninterrupted forming-edge, and a reciprocatory plunger.

23. A tool for forming seats in the necks of bottles or jars, comprising a two-part plunger-block, upper and lower sets of radially-expansible members, adapted to be simultaneously expanded so as to present an uninterrupted forming-edge and a reciprocatory plunger.

24. A tool for forming seats in the necks of bottles and jars, comprising a two-part plunger-block, upper and lower sets of radially-expansible and contractible members, adapted to be simultaneously expanded so as to present an uninterrupted forming edge, and a reciprocatory plunger.

25. A tool for forming seats in the necks of bottles and jars, comprising a two-part plunger-block, upper and lower sets of spring-pressed radially-expansible members, adapted to be simultaneously expanded so as to present an uninterrupted forming-edge and a reciprocatory plunger.

26. A tool for forming seats in the necks of bottles and jars, comprising a two-part plunger-block, upper and lower sets of spring-pressed, radially-expansible members adapted to be simultaneously expanded so as to present an uninterrupted forming-edge, and a reciprocatory plunger.

27. A tool for forming seats in the necks of bottles, comprising a two-part plunger-block, two sets of radially-expansible non-rotatable members, adapted to be simultaneously expanded so as to present an uninterrupted forming-edge, a reciprocatory plunger, and a backing-plate.

28. A tool for forming seats in the necks of bottles or jars, comprising a two-part plunger-block, a plurality of radially expansible and contractible members, adapted to be simultaneously expanded so as to present an uninterrupted forming-edge, a reciprocatory plunger, and a backing-plate.

29. A tool for forming seats in the necks of bottles or jars, comprising a two-part plunger-block, upper and lower sets of radially-expansible non-rotatable members, arranged to be simultaneously expanded so as to present an uninterrupted forming-edge, a reciprocatory plunger, and a backing-plate.

30. A tool for forming seats in the necks of bottles or jars, comprising a two-part plunger-block, upper and lower sets of radially-expansible and contractible non-rotatable members, arranged to be simultaneously expanded so as to present an uninterrupted forming-edge, a reciprocatory plunger, and a backing-plate.

31. A tool for forming seats in the necks of bottles or jars, comprising a two-part plunger-block, spring pressed radially-expansible non-rotatable members, arranged to be simultaneously expanded so as to present an uninterrupted forming edge, a reciprocatory plunger, and a backing-plate.

32. A tool for forming seats in the necks of bottles or jars, comprising a two-part plunger-block, spring pressed radially expansible non-rotatable members arranged to be simultaneously expanded so as to present an uninterrupted forming-edge, a reciprocatory plunger, and a backing-plate.

33. A tool for forming the necks of bottles or jars, comprising a plunger block composed of an upper and a lower section, a plurality of expansible neck forming members carried by each section, a backing plate and means for expanding said members.

34. A tool for forming the necks of bottles or jars, comprising a plunger block composed of upper and lower sections, a plurality of expansible neck forming members arranged in each section, means for limiting the lateral movement of said members and means for expanding the same.

35. A tool for forming the necks of bottles or jars, comprising a plunger block composed of upper and lower sections, a plurality of laterally slidable neck forming members carried by each section, means for limiting the movement of each member, and a reciprocating plunger.

36. A tool for forming the necks of bottles or jars, comprising a plunger block composed of upper and lower sections, a backing plate, a plurality of laterally slidable, spring pressed neck forming members arranged in each section, and a reciprocatory plunger for expanding the members.

37. A tool for forming the necks of bottles or jars, comprising a plunger block, composed of upper and lower sections, each section being provided with a plurality of radial grooves, expansible neck forming members arranged in the grooves of each section, a backing plate, and means for expanding the members.

38. A tool for forming the necks of bottles or jars, comprising upper and lower sections, each section being provided with a plurality of radial grooves, spring pressed, laterally slidable neck forming members arranged in the grooves of each section, a backing plate, and a reciprocatory plunger for expanding the members.

39. A tool for forming the necks of bottles or jars, comprising a plunger block composed of upper and lower sections, a plurality of spring pressed, laterally slidable neck forming members arranged in each segment, means for limiting the movement of each member, and a reciprocatory plunger for expanding the same.

In testimony whereof I affix my signature in presence of two witnesses.

GEORGE E. BOLTON.

Witnesses:
WALTER N. KELLEY,
J. J. HUBBARD.